United States Patent [19]

Bordat

[11] 4,096,817
[45] Jun. 27, 1978

[54] SUPPORTING FOIL FOR A HYDROFOIL COMPRISING AT LEAST ONE DEFORMABLE PART

[75] Inventor: André Jules Edmond Bordat, Aix en Provence, France

[73] Assignee: Societe Nationale Industrielle Aerospatiale, Paris, France

[21] Appl. No.: 697,270

[22] Filed: Jun. 17, 1976

[30] Foreign Application Priority Data

Jun. 17, 1975 France .............................. 75 18874

[51] Int. Cl.² .......................... B63B 1/18; B64C 9/00
[52] U.S. Cl. ................................... 114/280; 114/275; 244/219; 244/78; 244/90 R
[58] Field of Search .................. 114/66.5 H, 140, 162, 114/280, 275; 244/44, 78, 90 R, 219; 115/28 A, 28 R

[56] References Cited

U.S. PATENT DOCUMENTS

| 2,492,252 | 12/1949 | Wing | 244/78 |
| 3,118,639 | 1/1964 | Kiceniuk | 244/44 |
| 3,270,699 | 9/1966 | Bush | 114/66.5 H |

Primary Examiner—Tyrgve M. Blix
Assistant Examiner—Edward M. Wacyra
Attorney, Agent, or Firm—Karl W. Flocks

[57] ABSTRACT

A foil for a hydrofoil comprises a rigid part and a deformable trailing or leading edge part. The deformable part comprises a movable core jointed to the foil proper and having a resilient layer deposited on it, the resilient layer providing continuity of profile between the rigid and the deformable part.

7 Claims, 16 Drawing Figures

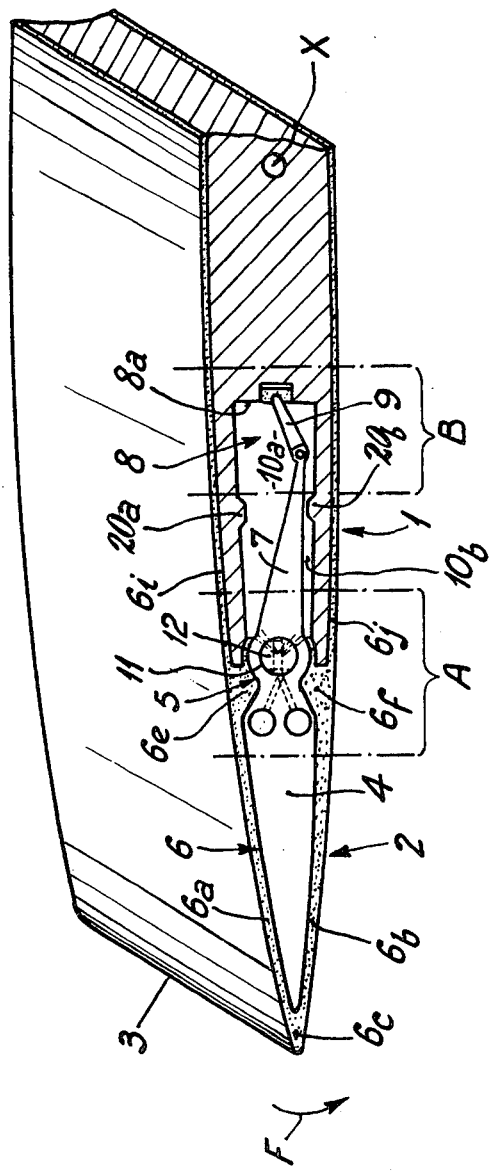

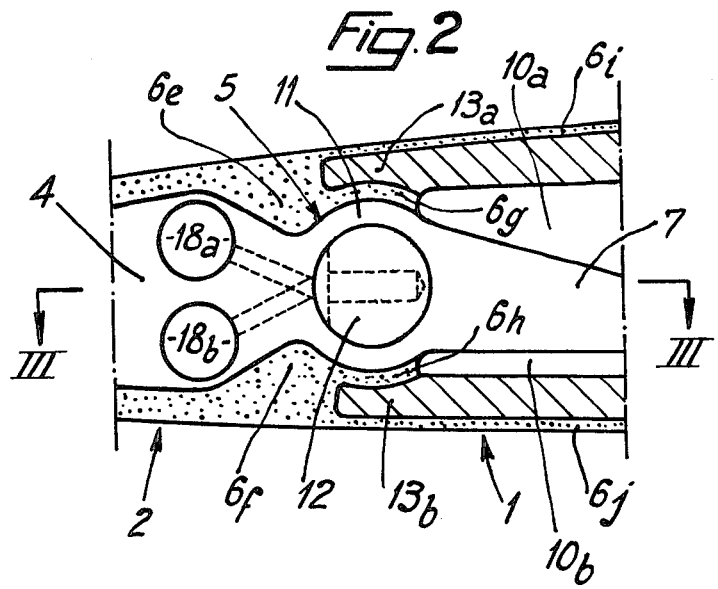
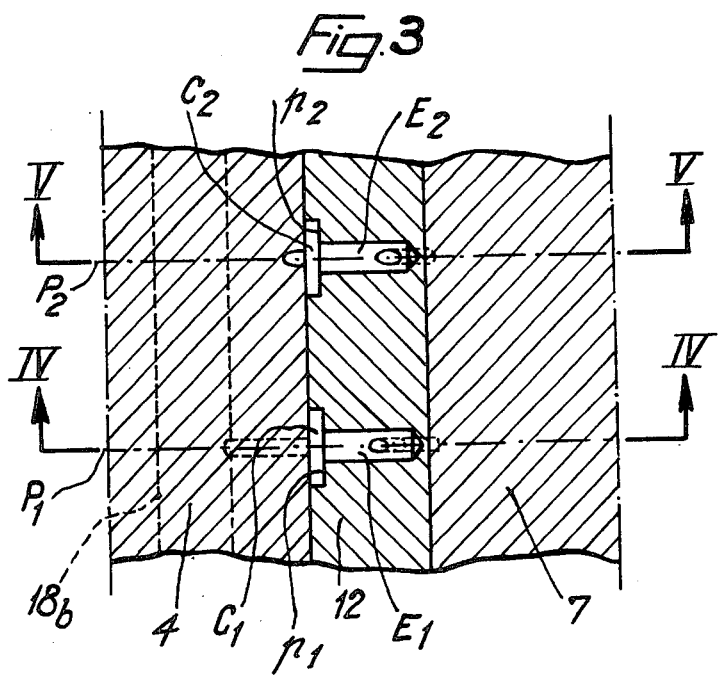

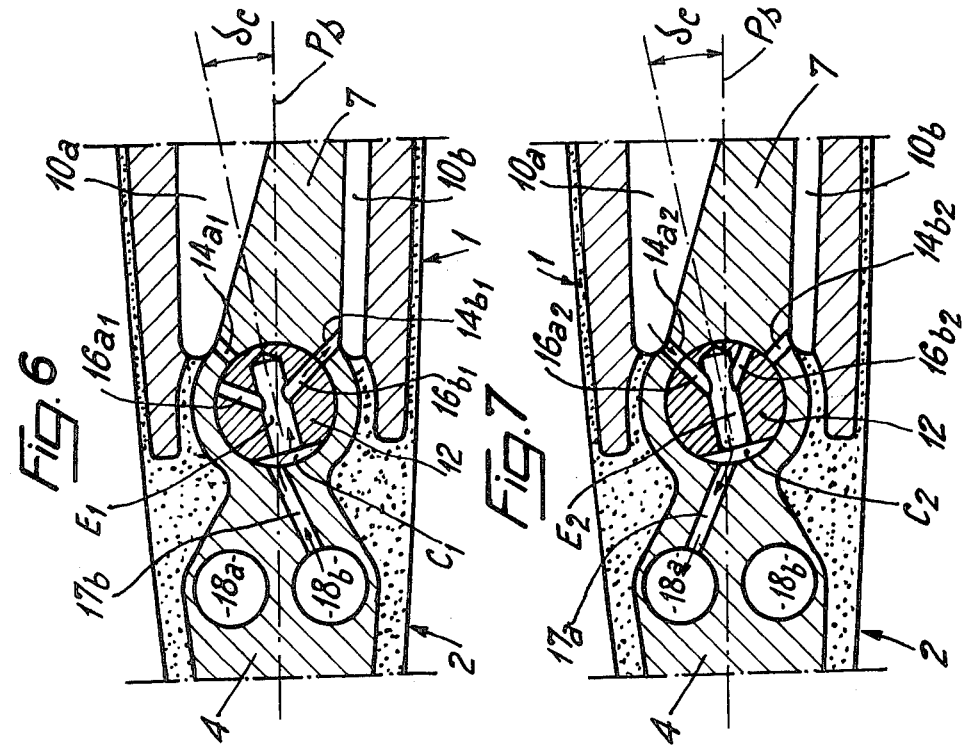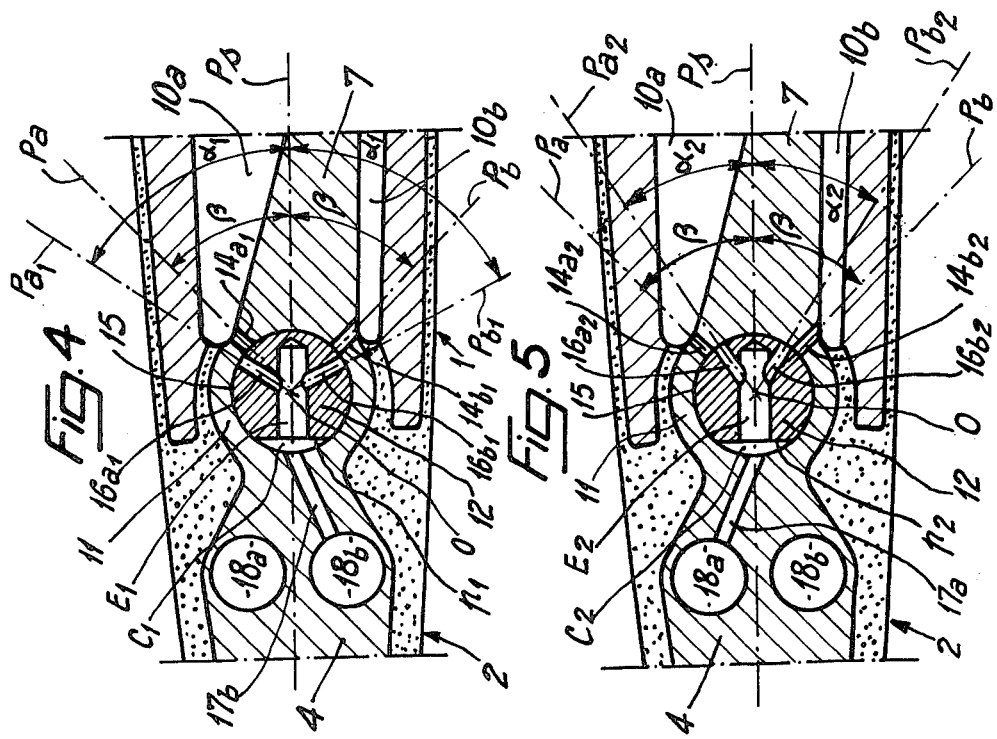

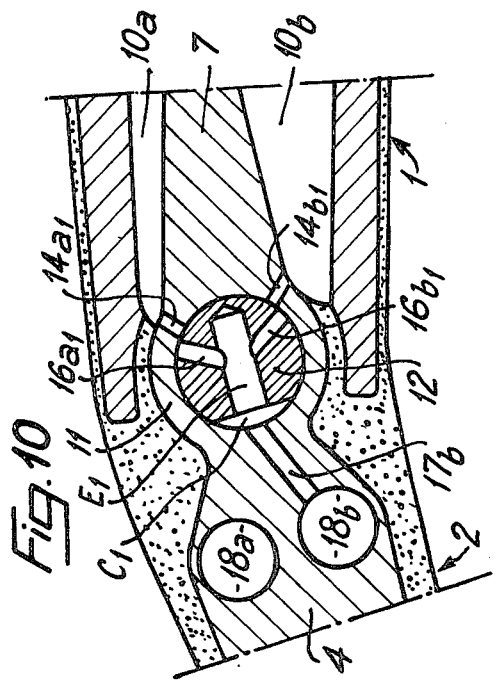
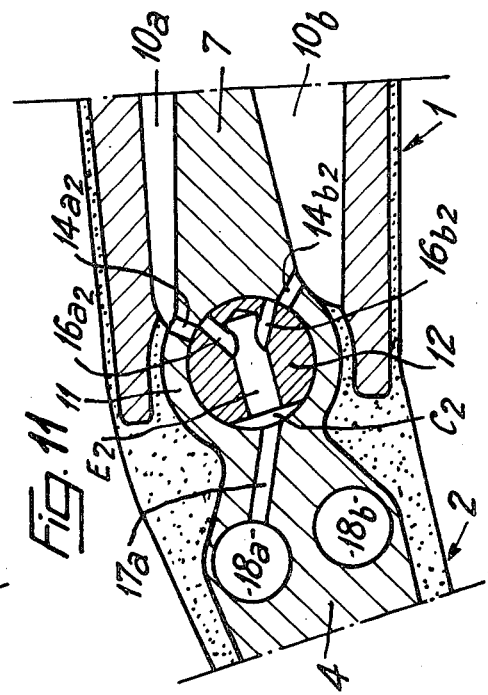
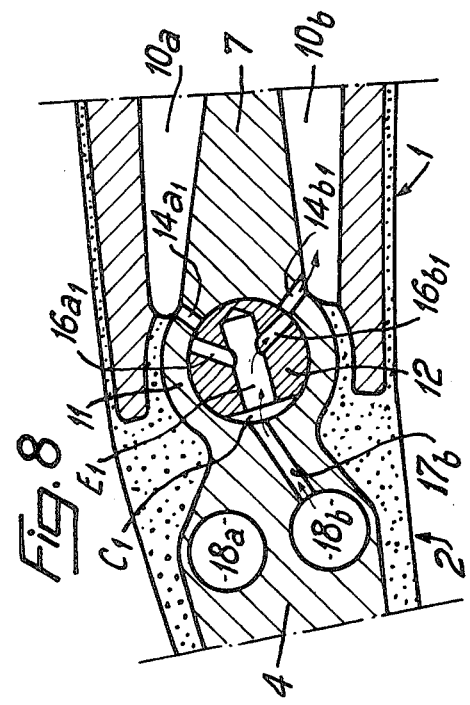
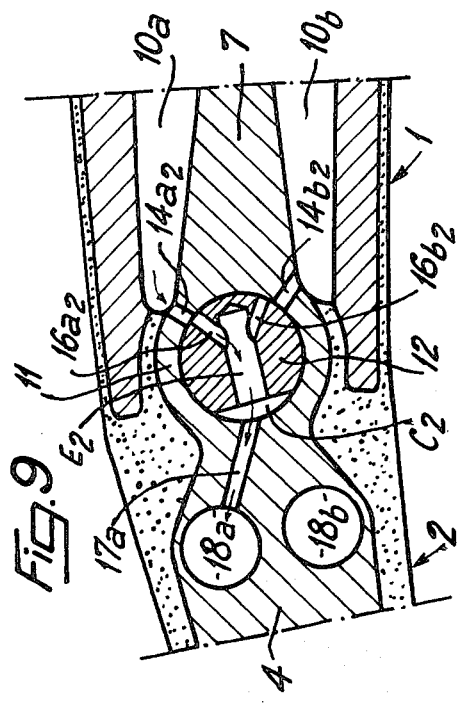

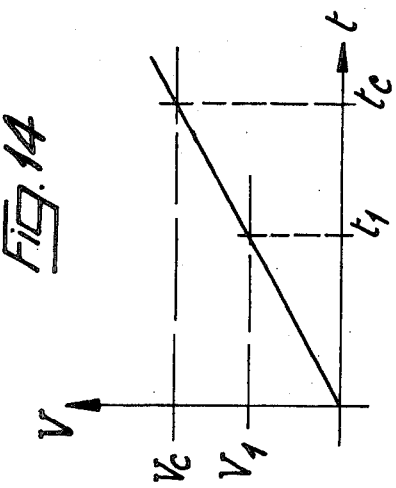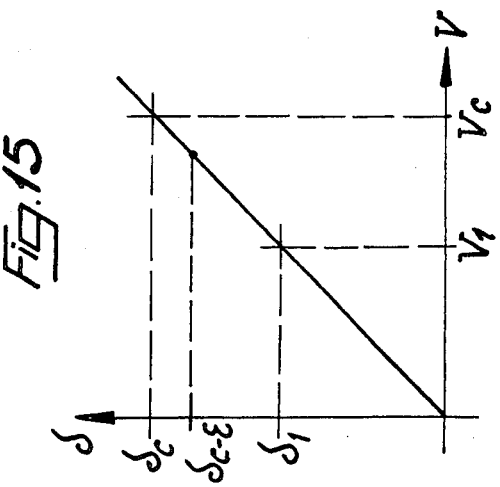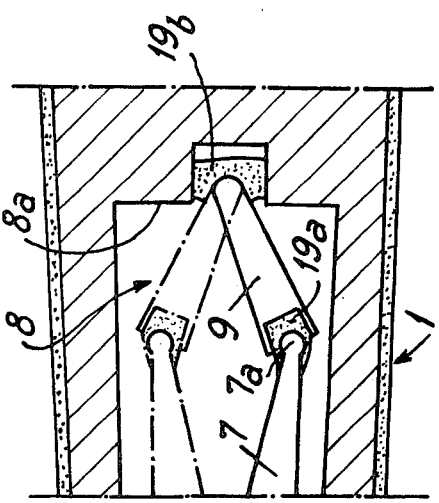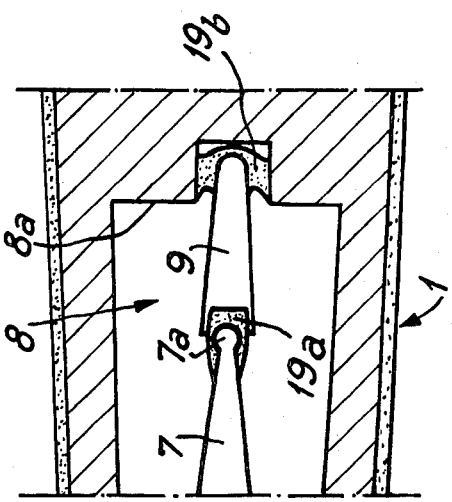

SUPPORTING FOIL FOR A HYDROFOIL COMPRISING AT LEAST ONE DEFORMABLE PART

The invention relates to a supporting foil for a hydrofoil, comprising at least one deformable part extending along the leading edge or the trailing edge for at least a fraction of the foil span.

Depending on the speed of a hydrofoil, a distinction is made between three operating regions of the supporting foil or foils, i.e. the sub-cavitation region in which the entire foil contour is in direct contact with the water; the trans-cavitation region in which pockets of water vapour form at certain points of the foil contour; and the super-cavitation region in which the profile operates with a permanent vapour cavity extending from the leading edge and thickening towards the trailing edge, to which it extends.

In order to obtain suitable lift in the three foil operating regions and avoid any perturbation at the speeds corresponding to the boundaries between these regions, the supporting foil or foils of a hydrofoil must be provided with means for modifying the camber and/or angle of incidence of the foil.

In U.S. Pat. Application Ser. No. 578,158 there is described a supporting foil having a hydrodynamic profile which can be adjusted by a system of flaps, some of which are on the leading edge and others of which are on the trailing edge of the foil, the system satisfying the aforementioned operating conditions. The flap system, however, requires complex control means which extend over the entire foil span, and some of which must be outside the contour thereof. The exterior control means and the flaps, when out of their respective recesses, produce flow discontinuities which impair the stability of the hydrofoil, at least in certain speed ranges. Furthermore, in the case of very thin supporting foils, none of the control means can be disposed inside the foil. In the latter case, a device is provided only for regulating the angle of incidence of the entire foil, the device comprising e.g. actuators disposed inside the vertical strut connecting the supporting foil to the aerofoil.

U.S. Pat. No. 3,270,699 describes a hydrofoil comprising a system of four vertical control surfaces each comprising a mobile core of rigid material (see the section in FIG. 3) jointed to a rigid part with interposition of layers of a resilient material such as rubber at the joint. Beyond the joint, the mobile core has a rigid prolongation extending into a cavity formed in the rigid part, and sacs are disposed on each side of the prolongation and filled with compressed air under controlled conditions so as to pivot the mobile core through a predetermined angle with respect to the rigid part. A device of this kind cannot be adapted to the supporting foil of a hydrofoil.

The supporting foil according to the invention, which comprises at least one deformable part extending along the leading edge or the trailing edge for at least a fraction of the span, likewise satisfies the operating conditions required in the different speed regions and at the boundaries between these regions, but does not have any of the disadvantages of the aforementioned flap system. The foil is at least partly deformable according to the invention and, more particularly, may be made relatively thin.

The supporting foil for a hydrofoil according to the invention is of the aforementioned kind and is characterised in that the deformable part essentially comprises a mobile core of rigid material jointed to a rigid part of the foil, a continuous profile between the deformable part and the rigid part being provided by a layer of resilient material deposited on to the mobile core and joint so as to embed them completely, and beyond the joint the core has a rigid prolongation extending inside a cavity formed in the rigid part of the foil, the prolongation being connected to the rear part of the cavity by a connecting means enabling it to pivot, and the prolongation co-operates with the connecting means to form a mobile wall dividing the cavity in sealing-tight manner into two variable-volume chambers for receiving and discharging a control fluid.

The supporting foil according to the invention, having an at least partially deformable profile, may also be pivotably mounted on a shaft so as to vary the angle of incidence of the entire foil.

In a preferred embodiment of the foil according to the invention, the mobile core is connected to its prolongation by a tubular sleeve element which is freely rotatable on a shaft and engages between two arms of the rigid part of the foil, with interposition of layers of a resilient sealing-tight material. This feature is advantageous insofar as the layers of resilient material, which embed the joint between the mobile core and the deformable part of the foil, normally hold the deformable part in its inoperative position and also return the deformable part to its inoperative position after it has been moved therefrom.

Preferably the shaft is mounted so that it can rotate with respect to the rigid parts of the supporting foil, and is constructed as a rotary distributor of control fluid for at least two communication pipe systems extending through the tubular sleeve and opening respectively into the two chambers of the cavity. This feature provides a particularly simple, compact and reliable construction of the means required for supplying a given volume of a control fluid when required to one out of the two chambers in the cavity and for discharging an equal volume of fluid from the other chamber. The rotary shaft for distributing fluid terminates at at least one end of the sleeve so that it can be rotated from the exterior by a control means. This feature is particularly advantageous for thin supporting foils, since there is no need to provide means for distributing the control fluid; such means would increase the thickness of the mobile core and the deformable part of the foil, more particularly near the pivot axis thereof.

By way of illustration, a preferred embodiment of a supporting foil for a hydroroil according to the invention is described hereinafter and diagrammatically illustrated in the accompanying drawings, in which:

FIG. 1 shows part of a partly deformable supporting foil according to the invention;

FIG. 2 is a view in elevation on a larger scale of part A in FIG. 1;

FIG. 3 is a section along line III — III in FIG. 2;

FIGS. 4 and 5 are sections along lines IV — IV and V — V of FIG. 3;

Figure 16:
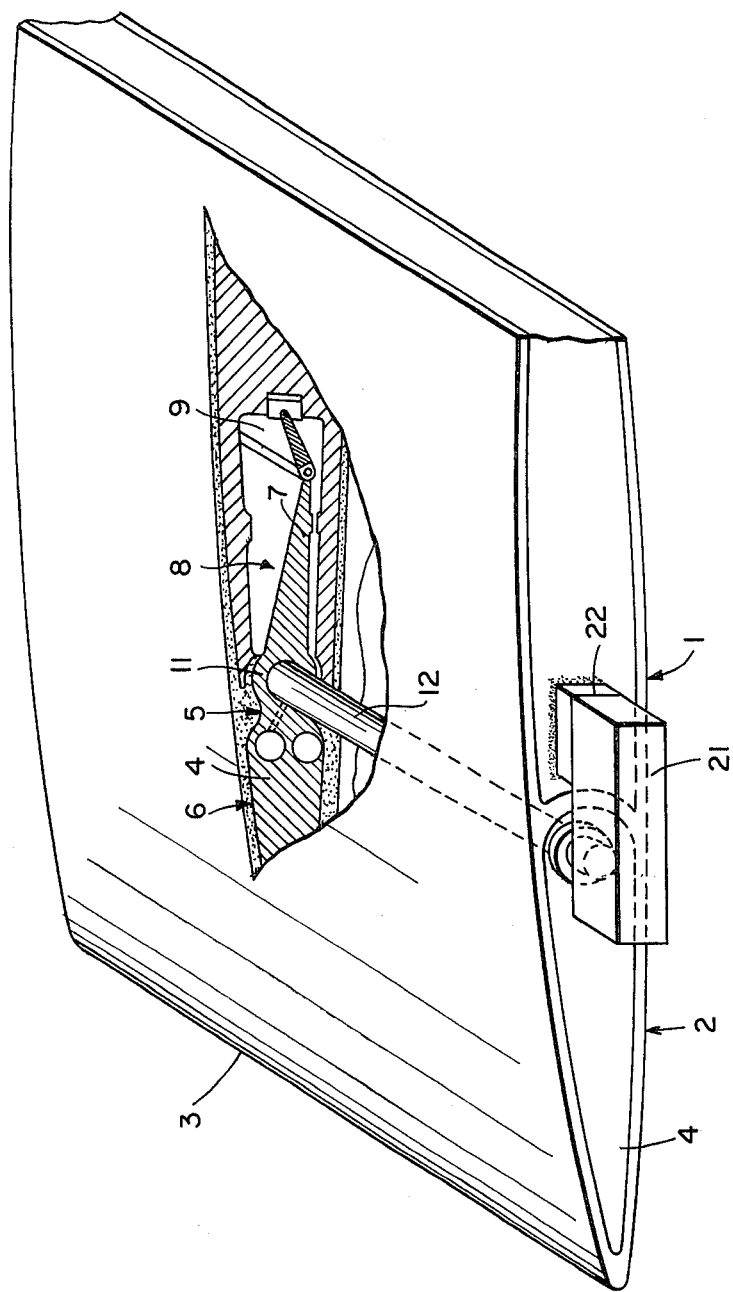

FIGS. 6, 8 and 10 on the one hand and 7, 9 and 11 on the other hand are views corresponding to FIGS. 4 and 5 respectively and showing successive phases of the deformation of the deformable part of the foil which is partly illustrated in FIG. 1;

FIGS. 12 and 13 are larger-scale views of part B of FIG. 1 for different positions of the deformable part of the supporting foil, and The diagrams in FIGS. 14 and 15 illustrate the operation of the means for controlling the deformable part of the foil.

FIG. 16 shows control means for the deformable part of a supporting foil according to the invention.

FIG. 1 shows a rigid part 1 of a supporting foil for a hydrofoil according to the invention, the foil comprising a deformable part 2 extending e.g. along the leading edge 3 of the foil along at least a fraction of its span. According to the invention, the deformable part 2 essentially comprises a mobile core 4 of rigid material, e.g. metal, jointed at 5 to the rigid part 1 of the foil; a continuous profile between the deformable part 2 and the rigid part 1 is provided by a layer 6 of a resilient material which is deposited on the top and bottom surfaces 6a, 6b of core 4, in front of core 4 at 6c to form the corresponding part of the leading edge 3 of the foil, and on each side of the joint 5 at 6e and 6f, so that core 4 and joint 5 are completely embedded in the resilient material 6. Beyond joint 5, core 4 has a rigid prolongation extending into a cavity 8 formed in the rigid part 1 of the foil; the prolongation 7 of core 4 is connected to the rear part 8a of cavity 8 by a connecting means 9 allowing prolongation 7 to pivot. Prolongation 7 co-operates with means 9 to form a wall 7 – 9 which can move integrally with core 4 and which divides cavity 8 in sealing-tight manner into two variable-volume chambers 10a and 10b.

In the embodiment under consideration, core 4 has a cross-section (in a plane perpendicular to the leading edge 3) which has the same shape but is smaller than the deformable part 2 of the foil, the top and bottom surfaces of core 4 being covered with layers 6a, 6b of resilient material having a constant, relatively small thickness. This feature, however, is optional, since the mobile frame could have a different cross-section from the deformable part of the foil, but is preferably elongated in the leading-edge direction. Core 4 can e.g. comprise an elongated plate of uniform thickness, having top and bottom surfaces covered with layers of resilient material, the thickness of which increases from the leading edge 3.

It can be seen that if a given volume of a control fluid, e.g. a liquid under pressure, is sent to chamber 10b or 10a, while an equal volume of control fluid is discharged from the other chamber 10a or 10b, wall 7 – 8 can be moved upwards or downwards so as to pivot core 4 on joint 5 via prolongation 7 upwards or downwards through a given angle as indicated by arrow F (FIG. 1). In this manner, the leading edge 3 of the foil is locally and temporarily deformed. FIG. 1 also shows a horizontal shaft X which e.g. provides a connection with a vertical strut (not shown) and extends through the rigid part 1 of the foil so that the angle of incidence of the entire foil can be varied under the action of suitable control means, which are well-known and not shown.

FIG. 2, which is on a larger scale, shows details of the joint 5 of mobile core 4. As FIG. 2 shows, the inner end of core 4 is connected to the neighbouring end of prolongation 7 by a tubular sleeve element 11, preferably in one piece with elements 4 and 7, in which case it is made of the same material, e.g. a metal. Alternatively, elements 4, 7 and 11 can be independent components made, if required, of different materials and secured together by suitable means. Tubular sleeve 11 is freely rotatable around a shaft 12 and engages between two arms 13a, 13b of the rigid part 1 of the foil, with interposition of layers 6g and 6h of a resilient material. As FIG. 2 clearly shows, layers 6g, 6h actually prolong the aforementioned parts 6e, 6f of the layer of resilient material 6. FIG. 2 also shows that parts 6e, 6f are also prolonged at 6i, 6j above the top and bottom elements 13a, 13b of the rigid part 1 of the foil, at least along a fraction of the rigid part 1, so as to provide a perfectly continuous join between part 1 and the deformable part 2.

Of course, the different parts 6a – 6j of the covering of resilient material are simultaneously deposited, e.g. by the method described in U.S. Pat. No. 3,669,589, issued June 13, 1972 to the present inventor. This feature can be used to provide a completely sealing-tight coating over the mobile core and joint. In addition, the layers 6g, 6h between the tubular sleeve 11 and the arms 13a, 13b of part 1, normally hold the mobile core 4 and return it, when necessary to its inoperative position.

Shaft 12 need not be connected at any point to the rigid part of the foil, in which case, as a result of being embedded in the resilient material, it acts as a floating shaft. Preferably, however, the shaft is secured at at least one point, e.g. at at least one end, to one or more rigid parts of the supporting foil, as in the embodiment shown in FIG. 16. In this embodiment, one end of shaft 12 is connected to the rigid part 1 of the foil through a control means 21, which bears at 22 on said rigid part 1, and is adapted for maintaining said shaft 12 in an angular position, with respect to said rigid part 1.

In a preferred embodiment illustrated in the accompanying drawings, shaft 12 is rotatable with respect to the rigid parts of the foil, inter alia part 1, and is constructed as a rotary distributor of control fluid via communication pipe systems ($14a_1$, $14b_1$ in FIG. 4, $14a_2$, $14b_2$ in FIG. 5), which extend through sleeve 11 and open respectively into the two chambers 10a, 10b of cavity 8.

As shown in FIGS. 3 – 5, the four communication pipes $14a_1$, $14b_1$, $14a_2$ and $14b_2$ are provided at the respective intersections between a) two radial planes of sleeve 11, the traces of which on the planes of FIGS. 4 and 5 are denoted by Pa and Pb respectively, and b) a first and a second plane P1 and P2 perpendicular to shaft 12 and coinciding with the planes of FIGS. 4 and 5 (lines IV — IV and V — V in FIG. 3). In the embodiment under consideration, the radial planes Pa, Pb form a dihedron angle $2\beta$, the apex of which coincides with the geometrical axis of the shaft (0 on FIGS. 4 and 5), the angle being bisected by the prolongation of the plane of symmetry of core 4 (whose trace on the planes on FIGS. 4 and 5 is denoted by Ps). At each of the planes $P_1$, $P_2$ perpendicular to shaft 12, a first or a second recess E1 (FIG. 4) or E2 (FIG. 5) respectively is formed inside shaft 12, inter alia in the form of a diametral bore opening on to the side surface 15 of shaft 12, respectively via two first distribution bores $16a_1$, $16b_1$ or two second bores $16a_2$, $16b_2$ and also opening via a third orifice which in turn opens on to a first or a second flat portion (p1 or p2) of shaft 12. References $Pa_1$, $Pb_1$ denote the traces on the plane of FIG. 4 of the dihedron having the angle $2\alpha_1$, the apex of which coincides with the geometrical axis of shaft 12 and the surfaces of which extend respectively through the first distribution bores $16a_1$, $16b_1$, whereas references $Pa_2$, $Pb_2$ denote the traces on the plane of FIG. 5 of the dihedron having the angle $2\alpha_2$, the apex of which likewise coincides with the geometrical axis of shaft 12, and the surfaces of which respectively extend through the second distribution bores $16a_2$, $16b_2$. By construction, the two dihedrons having the angles $2\alpha_1$, $2\alpha_2$ respectively are bisected by the plane containing both the geometrical axis of shaft 12 and the parallel axes of the diametric bores E1 and E2. By construction likewise, the aforementioned three dihedral angles are connected by the relation;

$$2\beta = (2\alpha_1 + 2\alpha_2)/2 \quad (1)$$

On the other hand, the flat portions $p1$ and $p2$ of the jointing shaft 12 bound a first and a second distribution chamber C1 and C2 respectively inside sleeve 11 (compare FIG. 3), the two chambers being connected by channels 17b (FIG. 4) and 17a (FIG. 5) to two respective ducts 18a, 18b formed in core 4 in a direction substantially parallel to that of shaft 12, the second parallel duct 18b being connected at one end to the source of control fluid, whereas the corresponding end of the other duct 18a is connected to the discharge for control fluid.

At least one end of the distributor shaft 12 is connected to a suitable known device (not shown) for driving in rotation. In FIGS. 4 and 5, shaft 12 is shown in the angular position which it occupies when shaft 4 and the deformable part 2 are in the inoperative position. In the aforementioned angular or starting position of shaft 12, the axial plane of the diametral bores E1, E2 coincides with the plane of symmetry P$s$ of the mobile core 4; since angles $\alpha_1$ and $\alpha_2$ are made different from one another, relation 1) hereinbefore shows that one angle ($\alpha_1$ in FIG. 4) is greater than $\beta$, whereas the other ($\alpha_2$ in FIG. 5) is less than $\beta$. In addition, the transverse dimensions of communication pipes $14a_1 - 14b_2$ and of the distribution bores $16a_1 - 16b_2$ are made such that, in the starting position of shaft 12, there is no communication between a communication pipe system and the corresponding distribution bore, as shown in FIGS. 4 and 5. Consequently, chambers 10a, 10b of cavity 8 are isolated from ducts 18a, 18b. It is assumed however, that they have both previously been filled with control fluid at neighbouring pressures, so that the two surfaces of walls 7 - 9 are subjected to equal, opposite pressure forces and prolongation 7 is not subjected to any control force. Finally, with regard to the subsequent explanation of the operation of the control fluid distribution device, it should be noted that in the starting position of shaft 12 shown in FIGS. 4 and 5, planes Pa, Pb respectively bisect the dihedrons having planes $Pa_1$, $Pa_2$ and $Pb_1$, $Pb_2$ as their surfaces, as is clear from relation 1) hereinbefore, when in the form:

$$\beta = (\alpha_1 + \alpha_2)/2$$

As shown in the embodiment in FIGS. 12 and 13, the connecting means 9 comprises a rigid element made e.g. of the same material as the prolongation 7 of core 4, the rigid element being disposed between the end of prolongation 7 and the rear part 8a of cavity 8, to which the connecting means 9 is respectively coupled by flexible, sealing-tight joints. In the example shown, the joints are made of resilient material, inter alia blocks 19a, 19b of a polyurethane elastomer. Block 19a is secured in a corresponding recess in one end of the connecting means 9, and the rounded end 7a of prolongation 7 is embedded in block 19a, which sticks to its lateral surface. Block 19b is secured in a corresponding cavity in the rear part 8a of cavity 8, and the other end of means 9 is embedded therein, as has just been explained. FIGS. 12 and 13 show different positions of the sealing-tight wall 7 - 9, i.e. its inoperative position corresponding to the absence of deformation of the deformable part of the foil (shown in solid lines in FIG. 12), its position corresponding to maximum deformation of the deformable part (chain-dotted lines in FIG. 12) and an intermediate position (solid line in FIG. 13).

Alternatively, means 9 can comprise an element made of deformable material e.g. plastics, the ends of which are respectively secured to the end of prolongation 7 and to the rear part 8a of cavity 8, if required via one or two sealing-tight flexible joints of the kind illustrated in FIGS. 12 and 13.

We shall now, with reference to diagrams 14 and 15, describe the operation of controlling the deformation of the deformable part 2 of the previously-described supporting foil.

For the purpose of steering the deformable part 2, the hydrofoil pilot actuates the means (not shown) for rotating the shaft 12 so that shaft 12 pivots from its starting position in FIGS. 4 and 5 in the trigonometrical direction through an angle:

$$\delta_c = \alpha_1 - \beta = \beta - \alpha_2, \quad (2)$$

in accordance with relation 1) hereinbefore. The pivoting of shaft 12 in the trigonometrical direction, the angular amplitude $\delta_c$ of which has been denoted in FIGS. 6 and 7 by the final rotary positions of the axes of bores E1 and E2 with respect to the axis of symmetry P$s$ of core 4, has the effect of bringing bore $16b_1$ and communication pipe $14b_1$ (FIG. 6) into coincidence, and also of bringing bore $16a_2$ and pipe $14a_2$ (FIG. 7) into coincidence. Consequently, as indicated by arrows in FIGS. 6 and 7, control fluid under pressure travels via duct 18a, channel 17b and chamber C1 into bore E1 of shaft 12, and thence into chamber 10b of cavity 8. The diagram in FIG. 14, for example, shows the progressive increase during time $t$ of the volume $v$ of control fluid thus introduced into chamber 10b. The resulting excess pressure therein subjects the prolongation 7 to a torque in the trigonometrical direction, which therefore pivots elements 4 and 7 in the trigonometrical direction, the volume of chamber 10b progressively increasing whereas the volume of chamber 10a decreases. The main result is that the control fluid initially contained in chamber 10a is discharged through the diametral bore E2 of shaft 12 and through chamber C2 and duct 18a.

FIGS. 8, 9 show an instant $t_1$ (FIG. 14) at which a volume $b_1$ of control fluid has been introduced into chamber 10b, the mobile core 4 having pivoted at the same instant (in the direction of arrow F in FIG. 1) through an angle $\delta_1$. In FIG. 5 a line passing through the origin shows the variation of the lastmentioned angle in dependence on the volume $b$ of control fluid introduced into chamber 10b. It can be seen from FIGS. 8 and 9 that at instant $t_1$ there is still partial coincidence between a) the distribution bore $16b_1$ and the communication pipe $14b_1$ and b) bore $16a_2$ and pipe $14a_2$. The steering motion of part 2 stops at the instant $t_c$ (FIG. 14) at which core 4 and prolongation 7 have pivoted from their inoperative position through an angle exactly equal to the ordinate $\delta_c$ of the point on FIG. 15 having an abscissa $v_c$ equal to the ordinate of the point on FIG. 14 which has an abscissa $t_c$. It can be seen from FIGS. 10 and 11 that at instant $t_c$, communication is completely broken between a) ducts 18a and 18b and b) chambers 10a and 10b, the axes of bores E1, E2 being again in the plane of symmetry Ps of core 4.

The steering angle $\delta_c$, which may reach e.g. 10°, is limited by the maximum angular deflections of prolongation 7 between abutments 20a, 20b (FIG. 1) in the side walls of cavity 8. The steering angle $\delta_c$ has a value which is defined by construction in accordance with relation 2) hereinbefore. It can be made exactly equal to the maximum angle of deflection of prolongation 7, as in the embodiment illustrated. Alternatively, the angle of deflection $\delta_c$ can be made to correspond to only a fraction, preferably a whole number fraction 1/N, of the maximum angle of deflection of prolongation 7. In that case, the deformable part 2 of the supporting coil can be given N for successive steering positions which are angularly equidistant from the inoperative position thereof.

In order to return the deformable part 2 to its inoperative position, the hydrofoil pilot simply has to rotate shaft 12 through angle $\delta_c$ in the non-trigonometrical direction. As shown in FIGS. 10 and 11, this causes $16a_1$ to coincide with pipe system $14a_1$ and bore $16b_2$ to coincide with pipe system $14b_2$, thus providing communication between a) chamber 10a and duct 18b connected to the source of control fluid and b) chamber 10b and duct 18b connected to the discharge for control fluid. Depending on the embodiment, the deformable part of the supporting foil can return to its inoperative position either in a single stage or in N successive stages, i.e. by passing through N-1 intermediate positions.

Under some operating conditions, it may happen that the intersection of the orifices of the pipe systems in the rear part 7 does not give an adequate flow cross-section. This disadvantage can be reduced as follows. When the steering angle taken by the mobile part 2 has reached a value $\delta_c-\epsilon$ which is slightly less than the set value $\delta_c$, shaft 12 is again pivoted in the trigonometrical direction by well known means (which can incidentally by entirely automatic) so that it accompanies core 4 and prolongation 7 at the end of their pivoting movement so as to temporarily to interrupt the progressive reduction in the common cross-section of the distribution bores and of the communication pipe systems in coincidence therewith. When bore 4 has reached the steering position defined by angle $\delta_c$, the last mentioned automatic means abruptly reverse the direction of rotation of shaft 12 and quickly return it to the position illustrated in FIGS. 10 and 11 at which the control-fluid circuits are completely cut off so as to stop the core 4 in the steering position corresponding to the set value $\delta_c$.

The supporting foil according to the invention can be embodied in various ways, all of which come within the invention. Some variations have already been indicated. In some applications, pipes $14a_1$ and $14b_2$ and bores $16a_1$ and $16b_2$ can have different cross-sections. There are various possible embodiments for the means for connecting the diametral recesses E1, E2 of shaft 12 to the source of control fluid and the discharge thereof respectively. If the foil dimensions and the diameter of shaft 12 are sufficient, two ducts corresponding to 18a, 18b can e.g. be provided in shaft 12 but can open correctly into bores E1, E2 respectively. In that case, the flat portions P1, P2 need not be provided on shaft 12. Alternatively, the tubular sleeve 12 can contain only two communication pipe systems opening into chambers 10a and 10b respectively, in which case shaft 12, which is constructed as a rotary distributor for the control fluid, is constructed so that either of the communication pipe systems can be connected to the control fluid source as required and the other pipe system can be connected to the discharge thereof, depending on the angular position of shaft 12, and, if required, also on the longitudinal position of shaft 12, which is slidably mounted in the tubular sleeve 11. Of course, the means for distributing and discharging the control fluid in chambers 10a, 10b can be quite independent of shaft 12 and formed inter alia in the rigid part 1 of the supporting foil. In that case, shaft 12 is used only as a joint, provided it is connected at at least one point to a rigid part of the foil. It may even be omitted, in which case the tubular sleeve 12, which can be solid if required, constitutes the rigid component of the flexible, sealing-tight joint of the deformable part 2.

The deformable part 2 can extend over the entire length of the leading edge (3 in FIG. 1) or trailing edge (not shown) or only over part of the leading edge or trailing edge. A number of deformable parts such as 2 separated by rigid non-deformable parts such as 1 can be provided along the leading edge 3 and/or along the trailing edge.

I claim:

1. A supporting foil for a hydrofoil, comprising a rigid part having an inner cavity, at least one deformable part extending along the leading edge or the trailing edge of the foil over at least a fraction of its span, the deformable part essentially comprising a mobile core of rigid material having a tubular sleeve freely rotatable on a shaft, continuity of profile between the deformable part and the rigid part being provided by a layer of resilient material deposited on to the mobile part and the tubular sleeve thereof and completely embedding them, the mobile core having a rigid prolongation beyond the tubular sleeve, extending into the inner cavity of the rigid part of the foil, and a single elongated connecting member joining the prolongation to the rear wall of the cavity and adapted for enabling the prolongation to pivot the connecting member forming with the prolongation a single mobile wall dividing the cavity in sealing-tight manner into two variable-volume chambers, the chambers receiving and discharging a control fluid.

2. A supporting foil according to claim 1, wherein the tubular sleeve engages between two arms of the rigid part of the foil, with interposition of layers of a resilient sealing-tight material.

3. A supporting foil according to claim 2, wherein at least one point on the shaft is connected to the rigid part of the foil through a control means bearing on the rigid part.

4. A supporting foil according to claim 2, wherein the shaft is constructed as a rotary distributor of control fluid through at least two communication pipe systems extending through the tubular sleeve and terminating respectively in the two chambers of the cavity inside the rigid part.

5. A supporting foil according to claim 4, also comprising four communication pipe systems provided at the respective intersections of two radial planes of the sleeve with a first and a second plane perpendicular to the shaft, at which a first and a second recess respectively are provided inside the shaft and open on to the side surface of the shaft via two first and two second distribution bores, the dihedron angles $2\alpha_1$, $2\alpha_2$ and $2\beta$ the apices of which coincide with the geometrical axis of the shaft and the surfaces of which extend respectively through the first distribution bores, through the second distribution bores and through the communication pipe systems, being connected by the relation $2\beta = (2\alpha_1 + 2\alpha_2)/2$, and means also being provided for connecting the first recess to a source of control fluid and connecting the second recess to a means for discharging control fluid.

6. A supporting foil according to claim 5 wherein the first and second recesses in the shaft each open via an orifice on to the side surface of the shaft, preferably on to a first and a second flat portion of the shaft respectively bounding a first and a second distribution chamber inside the tubular sleeve, the chambers communicating with a first and a second duct respectively, formed in the mobile core and respectively connected to the control fluid source and to the discharge means thereof.

7. A supporting foil according to claim 1, wherein the elongated connecting member comprises an elongated rigid element disposed between the end of the prolongation of the mobile core and the rear part of the cavity in the rigid part, the rigid element being connected to the prolongation and to the rear part respectively by flexible sealing-tight joints comprising connecting elements made of resilient material.

* * * * *